United States Patent
Heasman et al.

(10) Patent No.: US 6,819,338 B2
(45) Date of Patent: Nov. 16, 2004

(54) DEFINING VARIABLES USED IN A MULTI-LINGUAL INTERNET PRESENTATION

(75) Inventors: Brian Heasman, Oostduinkerke (BE); Benoît Loscher, Verviers (BE); Christopher Von Koschembahr, Ohain (BE); Steve Raspoet, Ternat (BE)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 10/006,744

(22) Filed: Nov. 8, 2001

(65) Prior Publication Data

US 2002/0149620 A1 Oct. 17, 2002

(30) Foreign Application Priority Data

Nov. 14, 2000 (EP) .............................. 00480105

(51) Int. Cl.⁷ .............................. G06F 3/00; G06F 3/16; G06F 17/20
(52) U.S. Cl. ...................... 345/730; 345/760; 345/747; 345/703; 715/500.1; 715/536; 704/8
(58) Field of Search ................................. 709/201, 202, 709/219, 203, 217, 204; 345/730, 732, 731, 760, 749, 748, 744, 745, 747, 746, 765, 866, 727, 716, 703, 717; 715/500.1, 513, 536, 501.1, 530; 704/2, 7, 1, 8

(56) References Cited

U.S. PATENT DOCUMENTS

| | | | | |
|---|---|---|---|---|
| 5,416,903 A | * | 5/1995 | Malcolm | .................... 345/703 |
| 5,835,768 A | * | 11/1998 | Miller et al. | ............. 345/703 X |
| 6,252,589 B1 | * | 6/2001 | Rettig et al. | ................. 345/703 |
| 6,381,567 B1 | * | 4/2002 | Christensen et al. | ........... 704/8 |
| 6,557,005 B1 | * | 4/2003 | Burget | ..................... 709/217 X |
| 6,717,588 B1 | * | 4/2004 | Miller et al. | ............. 345/703 X |
| 2003/0191817 A1 | * | 10/2003 | Fidler | ......................... 709/219 |

OTHER PUBLICATIONS

Dynamic Loading of Locale Specific Hyper Text Language (HTML) Pages, IBM Research Disclosure, UK, vol. 41, No. 407, Mar. 1, 1998.*

* cited by examiner

Primary Examiner—Raymond J. Bayerl
(74) Attorney, Agent, or Firm—Louis P. Herzberg

(57) ABSTRACT

The present invention provides methods, apparatus and systems for defining variables to be used in a multi-lingual presentation system accessed by the Internet network wherein a plurality of visual objects such as charts and/or slides controlled by a third party in a server can be accessed by any user of the Internet network having a workstation. In an example embodiment, visual objects are each associated with an audio recording in any language selected amongst several predetermined languages. This method generally includes creating a control file having variables defining all the parameters of a presentation requested by a user of the Internet network. The variables are defined in the control file previously to the presentation.

16 Claims, 3 Drawing Sheets

DEFINING VARIABLES USED IN A MULTI-LINGUAL INTERNET PRESENTATION

TECHNICAL FIELD

The present invention relates to Internet conferences and presentations. More particularly it relates to defining variables used in a multi-lingual Internet presentation system.

BACKGROUND

Today, audiences including thousands of participants in the world can attend conferences and presentations broadcast by the Internet network. During such a presentation, the participant can view visual objects such as charts, slides, images, graphics (generally in PowerPoint) and listen to prerecorded audio recordings associated with each visual object.

In general, the speaker who is in charge of adding audio comments to the visual object, does not assemble the final deliverable contents but could, via access to the Internet web pages, invoke the assembly process. The assembly is normally done by a third party who has the skills in creating the synchronized objects or an automatic system.

But there are many problems associated with creating a presentation having a synchronized audio recording to the visual objects. Thus, the speaker should have a ready access to equipment like a recording machine, a microphone or a PC with audio support to create the recording. An alternative is to go to a recording studio and to use facilities there, but this is not always immediately available and it is an expensive solution. If the user chooses to use a tape recorder, the third party which receives this media should have similar equipment available to replay the recording.

But, from its initial creation stage to its final published form, there can be many variants of the web deliverable presentation that end users view. During the initial stages of creation, there may be no audio available, so a set of web pages needs to be created so that the content creator can view the slides in a web format to proof read the contents. At some later stage, there may be added audio which uses generating another set of web pages which is different from the first one since it now includes audio.

If different types of audio streaming support are allowed, this again changes the format of the web pages and the number of web pages that have to be created.

Also, creators have differing requirements and as technology changes, and there may be other variables added. These variables can be the language of the audio, the different sizes of graphics, a survey, the presenter name, a title, a biography, an index of the slides, etc.

All these permutations consume large amounts of time in creating for each presentation its own unique set of HTML pages. Also, a simple change like an increase in the number of slides requires considerable rework. For example, "the export as HTML pages" function in a Freelance Graphic presentation will create 92 HTML pages for a 30 slide presentation. For Power Point, the similar function will create 72 HTML pages. Furthermore, these pages have only the basic navigation feature and do not include the required HTML functions for streaming audio.

SUMMARY OF THE INVENTION

Accordingly, an aspect of the invention is to achieve a method of defining previously all the variables to be used in a multi-lingual presentation without requiring HTML pages for each presentation for which different variables are used.

The invention provides therefore methods, apparatus and systems for defining variables to be used in a multi-lingual presentation system accessed by the Internet network wherein a plurality of visual objects such as charts or slides controlled by a third party in a server can be accessed by any user of the Internet network having a workstation. The visual objects are each associated with an audio recording in a language selected amongst several predetermined languages. This method includes in creating a control file including all the variables defining all the parameters of a presentation requested by a user of the Internet network, the variables being defined in the control file previously to the presentation.

BRIEF DESCRIPTION OF THE DRAWINGS

The above and other aspects, features and advantages of the invention will be better understood by reading the following more particular description of the invention in conjunction with the accompanying drawings wherein.

DETAILED DESCRIPTION OF THE INVENTION

Figure 1:
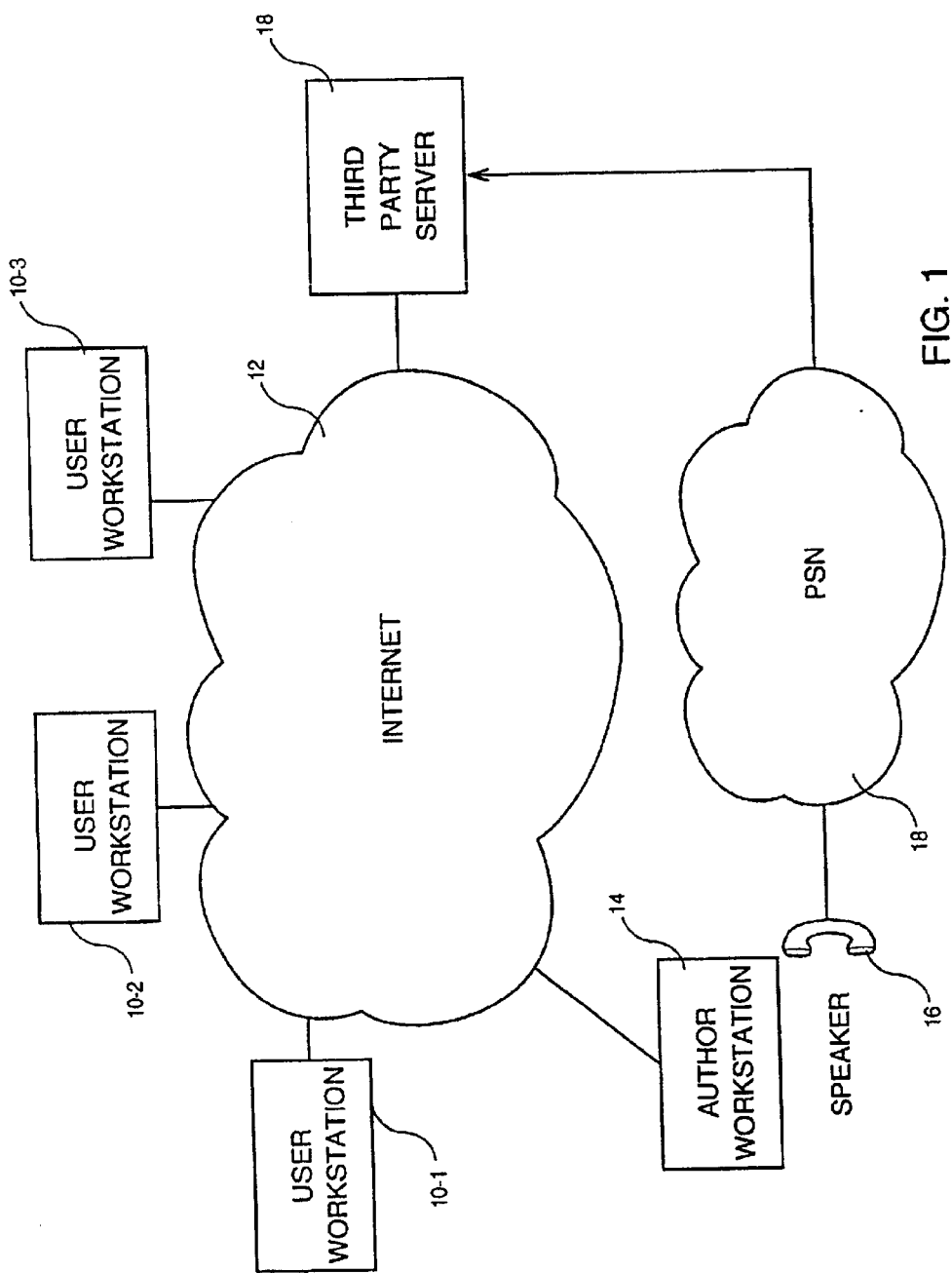
FIG. 1 is a block-diagram representing the general context wherein the invention is implemented.

Referring to FIG. 1, showing an embodiment which assumes that a third party responsible for a presentation system has already generated charts or slides to be presented to the users connected by their workstations 10-1, 10-2, 10-3, to the Internet network 12. The author (or a speaker) has then to record audio files each being associated with each chart or slide. The author has at his disposal a workstation 14 connected to the Internet network 12 and a telephone set 16 connected to the Public Switched Network (PSN) 18

The author of the presentation is provided with an identification number ID, a password and a telephone number (via web pages, e-mail or conversation with the third party). When he wants to record the audio recordings, he calls the third party server 20. At this time, the speaker is prompted to enter his ID by means of workstation 14.

The ID entered by the author determines the language to be used, the naming convention for the file and the location for the recordings. In general, the third party stores the objects and the corresponding audio files in the same location as that specified by the ID in a content directory. Thus, for example, the ID may include the number 6666 that is the directory name in which the final recordings are to be stored.

During creation of the charts or slides with synchronized audio, the author is asked several questions regarding the presentation. According to the main feature of the invention, this information is stored in a control file, preferably a javascript file which can be named "INI.JS" for example, and includes the title of the presentation, the number of slides, the duration of the presentation, the language used, the date of last update, the first slide, the abstract, the biography . . . ; that is all the variables used by the supporting HTML which are then accessed by any user of the presentation.

An example of code included in the control file with an explanation of the function in italics is given hereafter:

| Code | Description |
| --- | --- |
| AudioStatus="rec" | audio has been recorded, so enable the audio streaming option. |
| BambaJava="yes"; | provide the option of Bamba for Java audio streaming |
| BambaPlugin="yes"; | provide the option of Bamba Plugin audio streaming |
| commonDir="/common_v2_0/"; | the location where the html pages are located |
| cutpoints="6,12,18,24,30,36"; | the slide numbers for the start of a new part (chapter) |
| Duration="51"; | the time/duration of the audio (in minutes) |
| ExternalPres="no" | change the look and feel, plus colours to that of the Internet Server if 'yes' |
| FoilExtension="jpg"; | the file extension name of the slide. |
| FoilName="slide"; | the name prefix of the slide (in this example, slides will be named slide1.jpg, slide2.jpg, etc) |
| Ha1="no"; | Do not provide the option of HotAudio audio streaming |
| JbCodebase="/JavaBamba/"; | the location of the codebase files required for Bamba for Java audio streaming |
| language[1]="ENG,English"; | The language of the audio file and hence the language that should be used for the navigation controls |
| lastUpdate="23/05/00 17:29:05" | Date and time when the presentation was last modified |
| multipleResolutions="yes"; | Provide the option of large or small graphics. |
| presAbstract="A summary of the business to business opportunity with e-commerce. Outlines the opportunity, challenges, and the strategy for addressing this opportunity."; | Abstract for this presentation. |
| Email="heasmanb@be.ibm.com"; (if it has to be a real address then make it mine. | Email address of the presenter |
| presName="Big . . . Really BIG - The Business to Business Opportunity"; | Name of this presentation |
| questionURL="noquestion" | Does the presentation have a feedback feature (send questions to the presenter)? |
| showIcons="yes"; | Show icons or text-only links? |
| speakerBio=" Brian: has almost 15 years experience with IBM, and has been in e-business marketing since its inception at IBM. | Biography of the presenter |
| speakerName="Brian"; | Name of the presenter |
| SurveyURL="nosurvey"; | Does the presentation have a feedback feature (complete a survey)? |
| TotalSlides=42 | Number of slides in this presentation. |
| ReturnURL[1]="Online Library", http://Our_server.ibm.com/"; | Label and URL for a link |

Figure 2:
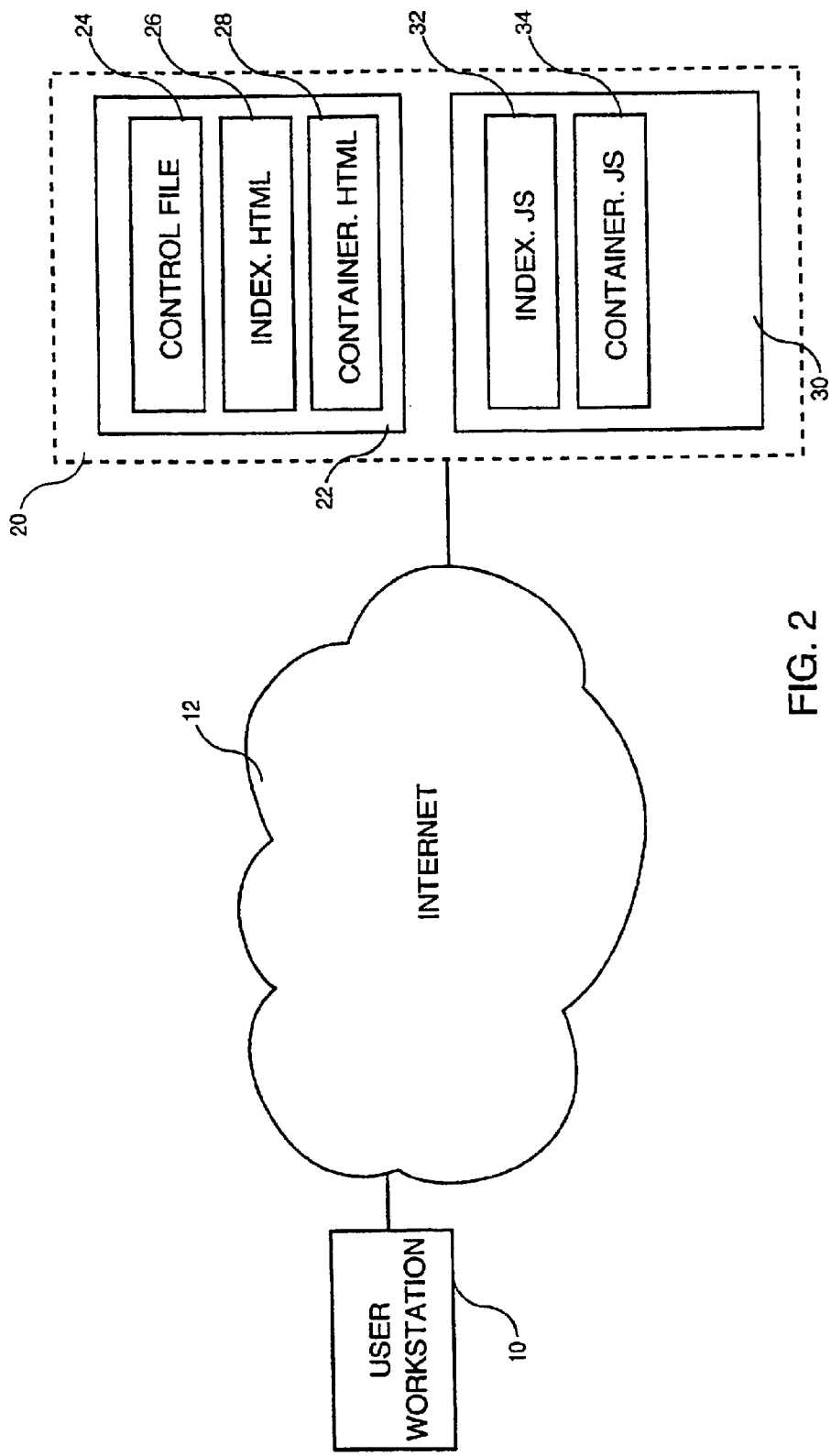
FIG. 2 is a block-diagram representing the third party server with the files that are transferred to the user workstation via the Internet network.

As shown in FIG. 2, the third party server 20 includes the content directory 22 which contains control file 24. The content directory also contains the graphic and audio files (not shown) and two generic files INDEX.HTML 26 and CONTAINER.HTML 28. But other generic files are contained in a common directory 30. Such generic files are INDEX.JS 32 and CONTAINER.JS 34 if they are javascript files.

Note that a reason the two generic HTML files are in the content directory 22 is that the user can link to them via a web browser. Other than loading the control file and specific files in the common directory, there is no functionality in these files. The real functionality is in the files within the common directory.

Figure 3:
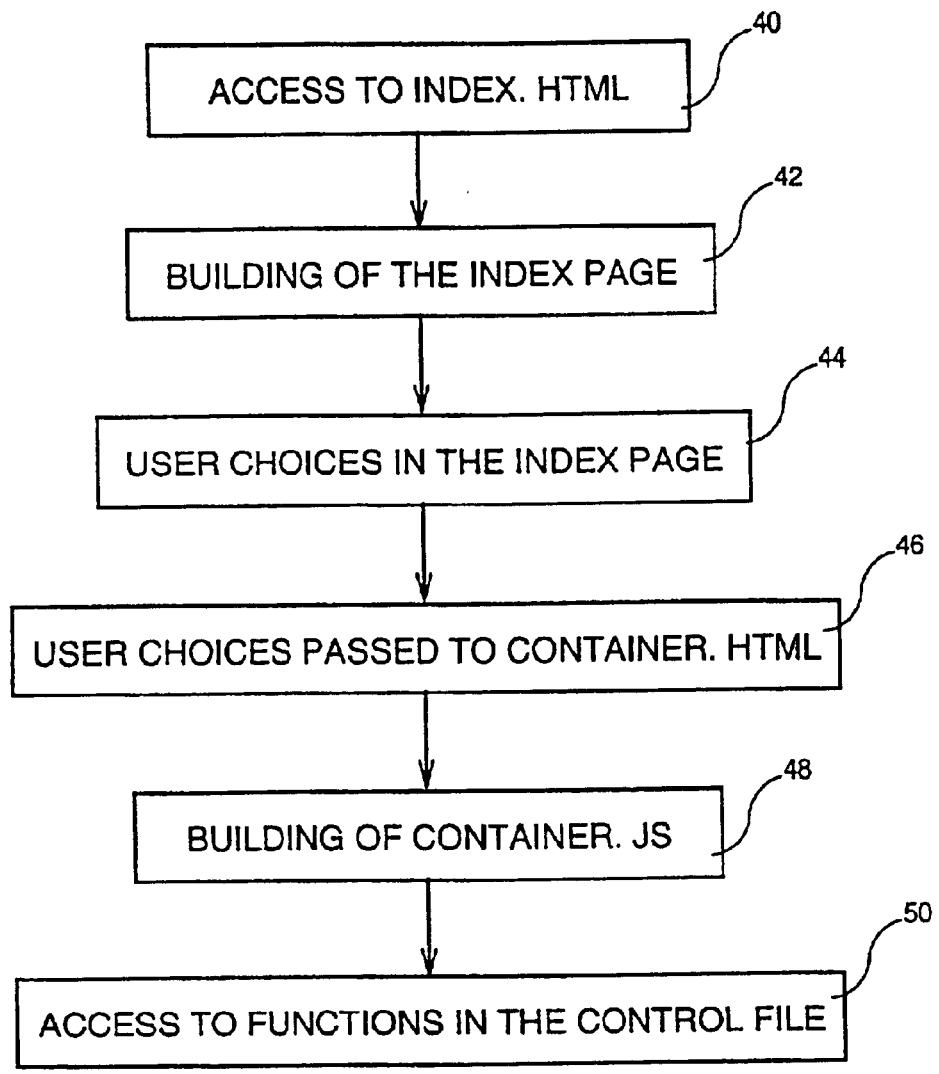
FIG. 3 represents a flow chart of the various steps used by the methods according to the invention when a user gets access to the third party server.

When an end user wants to have the presentation in the user workstation 10, the steps to be used are illustrated by the flow chart represented in FIG. 3. First, the user accesses INDEX.HTML (step 40) which is the introductory page describing the presentation and the speaker. Such an introductory page includes an example any combination of items in the following information:

Title of Presentation

Presenters Name

Number of Slides

Duration of the audio

Language/languages

Abstract of Presentation

Biography of Presenter

Picture of Presenter

Choice of large or small graphics

Which part (Chapter) they wish to start with.

Audio Steaming Options with or without icons.

In accessing INDEX.HTML, the control file (INI.JS) is automatically downloaded in the user workstation as well as INDEX.JS that is within common directory 30 in order to build the index page (step 42). The file INDEX.JS includes the real functionality needed to build the index page. The variables in the control file are then used to:

1. Complete INDEX.JS e.g. to display the title of presentation, INDEX.JS includes the following line of code: Document.write ('<H3>'4+presName+'</H3<') The presName variable from the control file is then used to complete this line of code with the title of the presentation.

2. Allow/disallow access to certain functions/features e.g. the index.JS has the possibility to let the user start presentation using different streaming technologies. All options are not necessarily shown, only those that are listed in the control file.

Once the index page is downloaded, the user can read the details on the presentation and the speaker and make certain choices in regard to the presentation he is about to start (step 44). These choices include the language being used, the size of foil graphics, the part number at which to start the presentation and the technology in which to listen to the audio.

Once the user has indicated he wants to start the presentation using certain options, the file CONTAINER.HTML is sent in the browser for the userworkstation. User choices are passed (step 46) by adding them in the URL (hash statement).

Then, the access to CONTAINER.HTML automatically loads the control file INI.JS and the file CONTAINER.JS that is within common directory 30. Similar to step 42, the control file is used to build CONTAINER.JS and allow/disallow functions and features (steps 48). The users choices that were passed in the URL are also used for this purpose. As an example, the control file can define the presentation as being divided in three parts: charts 1–5, charts 6–10 and charts 11–15. As a result the index page will offer the user the option to select at which part he wants to start the presentation (e.g. part 2). His choice is then passed in the URL to CONTAINER.HTML. The latter file looks at the control file to determine which charts are included in part 2 and displays only those charts.

Once the container page is completely built, the user will have access to certain functions as defined in the control file (step 50). Some of these functions will in return load HTML and/or JS files that are in common directory 30. As these files are loaded within a specific frameset, they can access the variables in the control file by reading them from COINTAINER.JS which is its parent. As an example, in the control file, the variable AskaQuestion is set to "yes". This results in the container displaying a button that the user can press to bring up "Question.HTML", which is a file in the common directory. This file will then read certain variables from the control file, such as e-mail address, and use this information to customize the otherwise generic Question.HTML file.

thus in an embodiment of the present invention is a method, apparatus and/or system to store the complementary information (basic information being the slides and associated audio recordings) in a control file, so that a very limited number of specially written HTML pages can use the variables within this file to provide the end result. By using this approach, the work associated with creating a presentation or the end viewed result is all included in this file as variables. Only one HTML Page per audio streaming type is used with the information needed for this page being stored as variables in the control file. Note also that the same HTML pages can be used for all presentations, the control file being the only file which is different.

Again, there is one HTML page which performs the function of the introductory page. This page gives an overview of what the presentation includes. On selecting an audio streaming option, the user enters a second page. There is one HTML page for every audio streaming option. For each additional function like Help, Survey, Ask a question, etc. there is a single HTML page per language being used. On inputting the second page, the user sees the graphics and will hear the first audio recording. Depending on the definition of the variables in the control file, the user will see a series of buttons for Help, Survey, et. Note that, since all the features and functions are stored in the control file, it is possible to make for example the Help function become an intelligent Help screen. Since the Help HTML Page can be made to read the control file, it can predetermine what the user has as options and only provide Help for the options visible.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention.

The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method comprising:

defining variables used in a multi-lingual presentation accessed from an Internet network, wherein a plurality of visual objects controlled by a third party in a server can be accessed by a user having a workstation coupled to said Internet network, each of said visual objects being associated with an audio recording in a language selected from predetermined languages; and creating a control file having the variables defining the parameters of a presentation requested by the user of said Internet network, said variables being defined in said control file previously to said presentation.

2. A method according to claim 1, further comprising including in said control file variables used by HTML pages accessed by the user of said Internet network requesting to get a presentation.

3. A method according to claim 2, further comprising including in said variables at least one variable from a group of variables including: a title of the presentation, a number of charts and/or slides in the presentation, a duration of the presentation, a language being used, a first slide of parts of the presentation, an abstract of the presentation any combination of these variables.

4. A method according to claim 1, further comprising the steps of:

creating a file INDEX.HTML having an introductory and/or index page describing:
   the presentation, and/or
   a speaker, and said user accessing said introductory and/or index page.

5. A method according to claim 4, wherein said introductory page includes an item from a group of items including:

title of presentation,
presenters name,
number of slides,
duration of the audio,
language/languages,
abstract of presentation,
biography of presenter,
picture of presenter,
choice of large and/or small graphics,
a part to start with,
audio streaming options with and/or without icons, and
any combination of these items.

6. A method according to claim 4, further comprising said user making choices when accessing said introductory page in said workstation, said choices including choosing an item from a group of items including: a language being used, a size of graphics on slides, a part number at which to start the presentation, a technology used to listen to the audio, recordings associated with slides, and any combination of these items.

7. A method according to claim 6, further comprising the step of creating a file CONTAINER.HTML which includes details of the presentation including the choices made by the user when accessing said introductory page.

8. A method according to claim 7, further comprising the user accessing functions defined in said control file using said file CONTAINER.HTML being loaded in said workstation.

9. A method according to claim 8, wherein said control file includes a variable "AskaQuestion" and said file CONTAINER HTML causes a button to be displayed in said workstation, and the user using said button to ask a question.

10. A method according to claim 1, wherein said visual objects include charts and/or slides.

11. A system comprising means adapted for carrying out the method according to claim 1.

12. A computer program product comprising a computer usable medium having computer readable program code means embodied therein for causing system functions, the computer readable program code means in said computer program product comprising computer readable program code means for causing a computer to effect the functions of claim 11.

13. An article of manufacture comprising a computer usable medium having computer readable program code means embodied therein for causing definition variables used in a multi-lingual presentation, the computer readable program code means in said article of manufacture comprising computer readable program code means for causing a computer to effect the steps of claim 1.

14. A program storage device readable by machine, tangibly embodying a program of instructions executable by the machine to perform method steps for defining variables used in a multi-lingual presentation, said method steps comprising the steps of claim 1.

15. An apparatus comprising:
   means for defining variables used in a multi-lingual presentation accessed from an Internet network, wherein a plurality of visual objects controlled by a third party in a server can be accessed by a user having a workstation coupled to said Internet network, each of said visual objects being associated with an audio recording in a language selected from predetermined languages; and
   means for creating a control file having the variables defining the parameters of a presentation requested by the user of said Internet network, said variables being defined in said control file previously to said presentation.

16. A computer program product comprising a computer usable medium having computer readable program code means embodied therein for causing apparatus functions, the computer readable program code means in said computer program product comprising computer readable program code means for causing a computer to effect the functions of claim 15.

* * * * *